Patented June 2, 1953

2,640,791

UNITED STATES PATENT OFFICE 2,640,791

COATED PAPER

Edwin J. Barber, Newport, Del., assignor to Hercules Powder Company, Wilmington, Del., a corporation of Delaware No Drawing. Application October 26, 1949, Serial No. 123,790

4 Claims. (Cl. 117—157)

This invention relates to a coated paper.

In the preparation of a coated paper, it is conventional to prepare a mixture of water and a pigment such as clay or the like, optionally together with other materials such as, for example, a soluble pyrophosphate which may act as a dispersing and stabilizing agent. This mixture, otherwise known as a pigment slip or, since it generally contains clay, as a clay slip, is then compounded with a binder or adhesive material to produce a composition known in the art as a coating color which is useful for coating a cellulose web. Considerable quantities of the binder are used, and, accordingly, the composition and characteristics of the binder are of great importance in determining the qualities of the finished paper. Important properties of the binder are that it must impart to the coating color or to the finished paper a high degree of brightness, smoothness and gloss, and a good finish and feel after calendering. In addition to these basic qualities required in coatings, there are various further characteristics that go far toward determining the value and utility of coating adhesives: (1) the coating color must flow smoothly and evenly so that it may be applied to paper at sufficiently high speeds to be economical in ordinary coating processes; (2) the coating must have high strength, to permit subsequent printing on the coated paper without "picking"; and (3) the coating must have a high wet-rub resistance for uses wherein the coated paper is treated with water as, for example, in off-set printing. It has previously been difficult to find a satisfactory adhesive or binder which is favorably adapted for these critical needs and which, at the same time, is economically available.

Now in accordance with the present invention, there may be prepared a new coating composition comprising a pigment or a clay slip with a binding material, the binding material being a water-soluble derivative of a carboxyalkyl hydroxyalkyl cellulose such as, for example, an alkali salt of carboxymethyl hydroxyethyl cellulose. According to one particular embodiment of the invention, sodium carboxymethyl hydroxyethyl cellulose is the binding material and the following examples specifically showing the operability of this material are presented in illustration of the invention but not in limitation thereof.

Example 1

A 70% clay slip was prepared by mixing 100 parts of pulverized clay with the required quantity of water and adding 0.5% sodium pyrophosphate based on the clay. Into the clay slip thus prepared, 9 parts of sodium carboxymethyl hydroxyethyl cellulose in the form of a 12.5% solution was readily blended, requiring only a small amount of stirring to give a smooth color. The color, with a pH of approximately 8–8.5 was then adjusted to a solids content of 44–52% and the mixture was passed through a 60-mesh screen to insure the absence of undispersed clay agglomerates. The screened coating color was then coated on mill-made coating base stock and the coated sheets were air-dried at room temperature, conditioned at 75% relative humidity and supercalendered. Test sheets were selected from the air-dried coated paper and were conditioned for two days at 23–24° C. and 50% relative humidity and then tested according to standard Dennison Wax Tests and a bonding strength test in comparison with a control sheet containing 20% commercial starch as the binder. The test sheets prepared according to this invention were comparable or superior to the control sheet in tests indicating printing performance.

Example 2

The procedure of Example 1 was followed except that the coating composition was adjusted to a higher solids ratio with the result that the sheets contained 12% binder based on the clay. The test sheets were conditioned as before and then subjected to the standard Dennison Wax Test and the bonding strength test as in Example 1. The printing performance of the test sheets was superior to that of control sheets containing 20% starch as a binder.

The coated paper resulting from the procedure of this example was characterized by excellent color, brightness and finish, and had good printing properties as indicated by satisfactroy Dennison Wax Tests.

The new coating color composition according to this invention comprises an aqueous mixture of a pigment or a clay slip with a binding material, the binding material being a water-soluble salt of a carboxyalkyl hydroxyalkyl cellulose. Although the potassium, ammonium, barium and calcium salts are operable in this invention, the sodium salt of carboxymethyl hydroxyethyl cellulose is preferred. For optimum results in the coating of paper, it is preferred to prepare a coating color having a total solids composition which is relatively high, thus providing good surface coating quality and economical operation. A preferred range of total solids for the coating color is between about 30 and 65% solids with an optimum value at about 40–55%. The amount of the binder in the coating color is maintained between about 5 and about 15% based on the weight of clay and preferably between 8 and 12%. A composition containing an amount of total solids and binder in this range is characterized by being readily applied to the surface of the paper and by forming a highly resistant coating thereon. Utilizing the coating color according to this invention, there is produced a coated paper with highly satisfactory primary qualities such as color, brightness, smoothness, gloss and the like and which is highly satisfactory for use in printing operations and is resistant to disturbance of the clay coating surface through rubbing, picking, and the like.

In a preferred embodiment of this invention, paper which has been coated by means of the coating color described herein is subjected to a further treatment causing the binder to become insolubilized and, accordingly, more resistant to the effects of water and the like. Thus, sodium carboxymethyl hydroxyethyl cellulose may be treated with an insolubilizing agent such as, for example, glyoxal, acetaldehyde, furfural, formaldehyde and formaldehyde-producing materials such as monomethylol dimethyl hydantoin, thereby rendering the coating highly insoluble and strongly adhesive. The coatings of this invention may be rendered water insoluble by the utilization of ions of aluminum, iron and zirconium which are effective adhesive precipitants. As mentioned hereinbefore, water-insoluble coatings having a high wet-rub resistance are particularly useful in the process of off-set printing.

The pigment material which is utilized in the coating color comprises one of the conventional paper coating materials such as, for example, a pulverized clay or the like. For higher quality or special types of paper there may be substituted therefor other known pigment materials such as, for example, calcium carbonate, titanium dioxide, satin white or other coating pigments alone, or preferably with a clay base. The modification of the coating color using these materials will be within the knowledge of those skilled in the art and it is to be understood that the pigment material as contemplated herein includes any or all of these materials.

The utility of applicant's invention is not limited to the particular type of paper pulp used, and, accordingly, applicant's invention may be utilized with the various types of kraft, soda, sulfite pulp, and the like, as well as with various other chemical and semichemical paper pulps. By the same token, the invention may be utilized with various types of paper products such as paper, fiberboard, molded pulp products, and the like. In all instances, the product produced by applicant's invention is characterized by being relatively resistant to abrasion and by having a surface of fine quality and improved printing properties.

What I claim and desire to protect by Letters Patent is:

1. A coated paper having a base of cellulosic fibers and a printing surface consisting essentially of a film of contiguous, water-insoluble, inorganic pigment particles interspersed in binder by means of which the pigment is retained on the base, said binder consisting of a water-soluble inorganic salt of a carboxymethyl hydroxyethyl cellulose, said film containing from about 5 to about 15 parts by weight of said binder to 100 parts by weight of the pigment.

2. A coated paper having a base of cellulosic fibers and a printing surface consisting essentially of a film of contiguous, water-insoluble, inorganic pigment particles interspersed in binder by means of which the pigment is retained on the base, said binder consisting of a water-soluble metal salt of a carboxymethyl hydroxyethyl cellulose, said film containing from about 5 to about 15 parts by weight of said binder to 100 parts by weight of the pigment.

3. A coated paper having a base of cellulosic fibers and a printing surface consisting essentially of a film of contiguous, water-insoluble, inorganic pigment particles interspersed in binder by means of which the pigment is retained on the base, said binder consisting of a water-soluble sodium carboxymethyl hydroxyethyl cellulose, said film containing from about 5 to about 15 parts by weight of said binder to 100 parts by weight of the pigment.

4. A coated paper having a base of cellulosic fibers and a printing surface consisting essentially of a film of contiguous, water-insoluble, inorganic pigment particles interspersed in binder by means of which the pigment is retained on the base, said binder consisting of a water-soluble ammonium carboxymethyl hydroxyethyl cellulose, said film containing from about 5 to about 15 parts by weight of said binder to 100 parts by weight of the pigment.

EDWIN J. BARBER.

References Cited in the file of this patent

UNITED STATES PATENTS

| Number | Name | Date |
| --- | --- | --- |
| 1,682,293 | Lilienfeld | Aug. 28, 1928 |
| 2,137,343 | Maxwell | Nov. 22, 1938 |
| 2,148,952 | Maxwell | Feb. 28, 1939 |
| 2,308,664 | Young et al. | Jan. 19, 1943 |
| 2,373,933 | Weeks | Apr. 17, 1945 |
| 2,425,768 | Wagner | Aug. 19, 1947 |
| 2,441,927 | Adams | May 18, 1948 |

OTHER REFERENCES

Boyd et al., I, Abstracts of British Chemical Society (London), 1908, T838, 839 and 840.

Boyd et al., II, Abstracts of British Chemical Soc. (London), 1909, T1807, 1808 and 1809.